United States Patent
Fan et al.

(10) Patent No.: US 10,101,558 B2
(45) Date of Patent: Oct. 16, 2018

(54) LENS DRIVING DEVICE

(71) Applicant: TDK TAIWAN CORP., Yangmei, Taoyuan (TW)

(72) Inventors: Chen-Hsien Fan, Yangmei Taoyuan (TW); Shu-Shan Chen, Yangmei Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 0 days.

(21) Appl. No.: 15/407,729

(22) Filed: Jan. 17, 2017

(65) Prior Publication Data

US 2017/0363837 A1    Dec. 21, 2017

(30) Foreign Application Priority Data

Jun. 20, 2016 (TW) .............................. 105119268 A

(51) Int. Cl.
  *G02B 7/09*    (2006.01)
  *G02B 27/00*   (2006.01)
  *H04N 5/225*   (2006.01)
  *H04M 1/02*    (2006.01)

(52) U.S. Cl.
  CPC ........... *G02B 7/09* (2013.01); *G02B 27/0006* (2013.01); *H04N 5/2254* (2013.01); *H04M 1/0264* (2013.01)

(58) Field of Classification Search
  CPC ....................................................... G02B 7/09
  USPC ......................................................... 359/823
  See application file for complete search history.

(56) References Cited

U.S. PATENT DOCUMENTS

| | | | |
|---|---|---|---|
| 2013/0027600 A1* | 1/2013 | Pavithran | H04N 5/2171 348/335 |
| 2014/0247389 A1* | 9/2014 | Lee | G03B 17/08 348/373 |

FOREIGN PATENT DOCUMENTS

| | | |
|---|---|---|
| CN | 202906716 U | 4/2013 |
| CN | 105356714 A | 2/2016 |

OTHER PUBLICATIONS

Taiwanese Office Action dated Dec. 8, 2016 in Application No. 10521515730.

* cited by examiner

*Primary Examiner* — James Jones

(74) *Attorney, Agent, or Firm* — Muncy, Geissler, Olds & Lowe, P.C.

(57) ABSTRACT

A lens driving device is provided, including a frame, a lens holder, and a dust-proof structure. The frame includes a top casing and a bottom base. The lens holder carries a lens and is movably disposed in the frame and has a first anti-twist structure. A second anti-twist structure corresponding to the first anti-twist structure is formed on a surface of the bottom base. The dust-proof structure is formed on the surface of the bottom base to prevent dust from entering a receiving hole in the bottom base, and the receiving hole is used for receiving an image sensor.

19 Claims, 7 Drawing Sheets

LENS DRIVING DEVICE

CROSS REFERENCE TO RELATED APPLICATIONS

The present application claims priority of Taiwan Patent Application No. 105119268, filed on Jun. 20, 2016, the entirety of which is incorporated by reference herein.

BACKGROUND OF THE INVENTION

Field of the Invention

The invention relates to a lens driving device, and in particular to a lens driving device having anti-twist and dust-proof designs.

Description of the Related Art

Many mobile devices such as mobile phones are equipped with digital camera functions as a basic requirement nowadays, and this is possible thanks to the miniaturization of lens driving devices. In order to provide automatic focusing or zooming, a commonly used miniature lens driving device is a Voice Coil Motor (VCM), which carries a lens and can move the lens back and forth along an image-capturing optical axis by means of a coil, driving magnets, and spring sheets.

However, in traditional lens driving devices, when the lens is screwed into the through hole of a lens holder, the torsional force generated may damage the spring sheets connected with the lens holder and reduce the life of the spring sheets.

On the other hand, when the lens holder moves the lens back and forth along the image-capturing optical axis, the dust generated from collision between the lens holder and other parts in the lens driving device may also easily enter a space for receiving an image sensor to affect the image sensing quality of the image sensor.

BRIEF SUMMARY OF THE INVENTION

In view of the aforementioned problems, one object of the invention is to provide a lens driving device having anti-twist and dust-proof designs which can avoid damage to the spring sheets caused by the torsional force generated by the lens being screwed into the through hole of the lens holder, and can prevent the image sensing quality of the image sensor from being affected by dust.

An embodiment of the invention provides a lens driving device, including a frame, a lens holder, and a dust-proof structure. The frame includes a top casing and a bottom base. The lens holder carries a lens and is movably disposed in the frame and has a first anti-twist structure. A second anti-twist structure corresponding to the first anti-twist structure is formed on the surface of the bottom base. The dust-proof structure is formed on the surface of the bottom base to prevent dust from entering a receiving hole in the bottom base, and the receiving hole is used for receiving an image sensor.

In some embodiments, the dust-proof structure is protruding from the surface of the bottom base along the receiving hole, and the dust-proof structure is an annular protrusion structure.

In some embodiments, when the lens holder moves toward the bottom base and the first and second anti-twist structures contact each other, the lens holder is restricted to further move toward the bottom base.

In some embodiments, the lens holder further has a plurality of first anti-twist structures.

In some embodiments, the surface of the bottom base further forms a plurality of second anti-twist structures corresponding to the first anti-twist structures, and the bottom base is a quadrilateral structure with the second anti-twist structures disposed at four corners thereof.

In some embodiments, the lens driving device further includes an adhesive layer coated on the surface of the bottom base.

In some embodiments, the adhesive layer is also coated on the surface of the bottom base between the second anti-twist structure and the dust-proof structure.

In some embodiments, the dust-proof structure is protruding from the surface of the bottom base along the receiving hole, and the dust-proof structure is an annular protrusion structure.

In some embodiments, the height of the dust-proof structure is less than that of the second anti-twist structure.

In some embodiments, the second anti-twist structure has a main body part and a base part, and the base part is connected between the surface of the bottom base and the main body part for increasing overall structural strength of the second anti-twist structure.

Another embodiment of the invention also provides a lens driving device, including a frame, a lens holder, and an adhesive layer. The frame includes a top casing and a bottom base, and the bottom base has a recess. The lens holder carries a lens and is movably disposed in the frame. The adhesive layer is formed in the recess of the bottom base to adhere dust in the frame.

In some embodiments, the bottom base further has a dust-proof structure formed on a surface of the bottom base to prevent dust from entering a receiving hole in the bottom base, and the receiving hole is used for receiving an image sensor.

In some embodiments, the dust-proof structure is protruding from the surface of the bottom base along the receiving hole, and the dust-proof structure is an annular protrusion structure.

In some embodiments, the recess is annular and adjacent to the dust-proof structure.

In some embodiments, the recess is annular.

In some embodiments, the bottom base further has a stopper structure used to restrict the displacement of the lens holder toward the bottom base.

In some embodiments, the bottom base further has a dust-proof structure formed on a surface of the bottom base to prevent dust from entering a receiving hole in the bottom base, and the receiving hole is used for receiving an image sensor.

In some embodiments, the stopper structure is ladder-shaped and has a main body part and a base part, wherein the base part is connected between the surface of the bottom base and the main body part for increasing overall structural strength of the stopper structure.

In some embodiments, the height of the dust-proof structure is less than that of the stopper structure.

In some embodiments, the distance between the lens holder and the stopper structure is less than the distance between the lens holder and the dust-proof structure.

In order to illustrate the purposes, features, and advantages of the invention, the preferred embodiments and drawings of the invention are shown in detail as follows.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
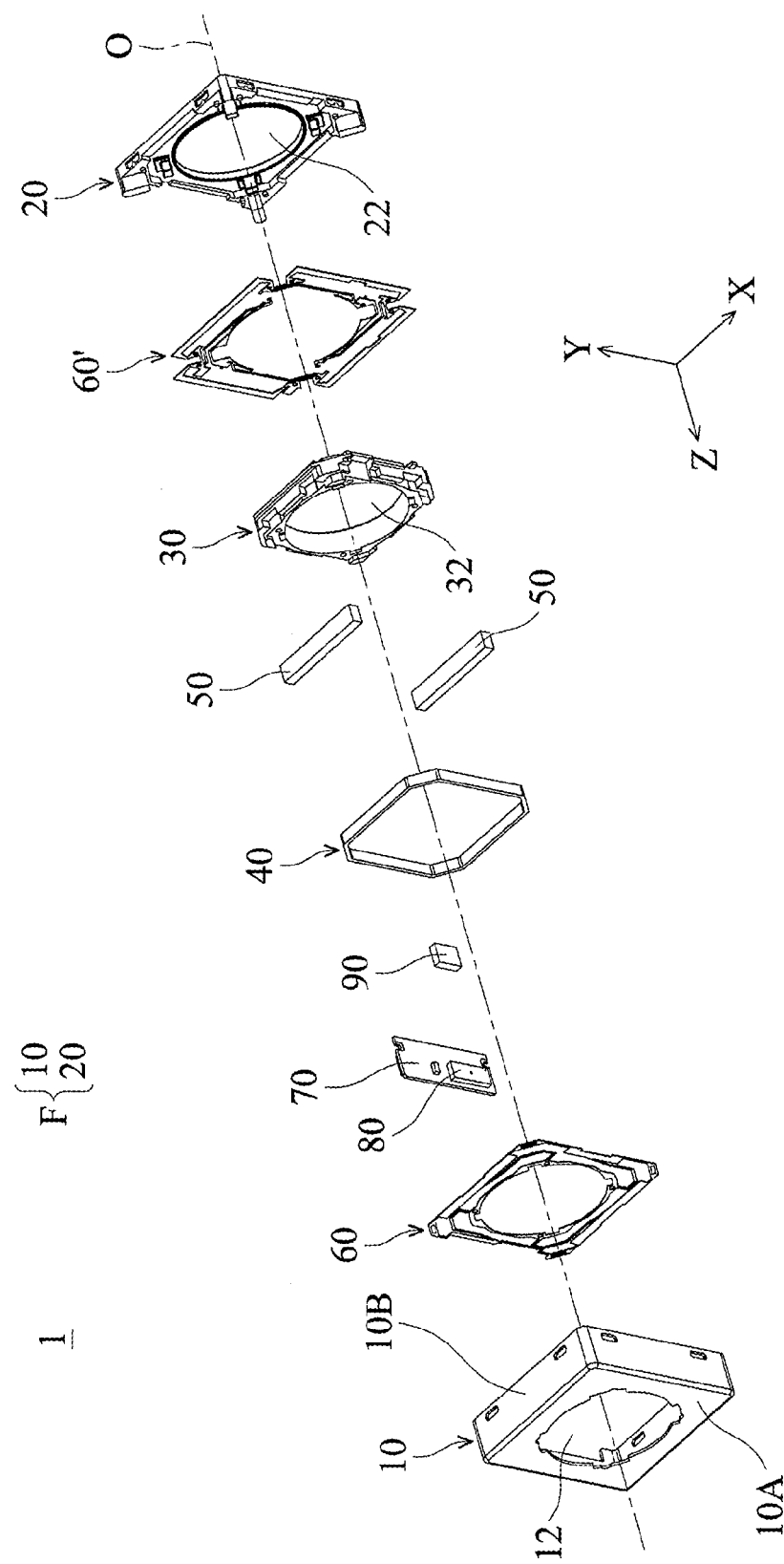
FIG. 1 is an exploded view of a lens driving device in accordance with an embodiment of the invention.

A detailed description is given in the following embodiments with reference to the accompanying drawings.

In the following detailed description, the orientations of "on", "above", "under", and "below" are used for representing the relationship between the relative positions of each element as illustrated in the drawings, and are not meant to limit the invention.

Referring to FIG. 1, which is an exploded view of a lens driving device 1 in accordance with an embodiment of the invention. It should be realized that, the lens driving device 1 may be a Voice Coil Motor (VCM), which defines three axial directions that are perpendicular to each other, namely an X-axis direction, a Y-axis direction, and a Z-axis direction, and includes a lens (not shown) therein, wherein the lens defines an image-capturing optical axis O which is substantially parallel to the Z-axis.

As shown in FIG. 1, the lens driving device 1 includes a top casing 10, a bottom base 20, a lens holder 30, a coil 40, several (e.g. two) driving magnets 50, an upper spring sheet 60, a lower spring sheet 60', a circuit board 70, a magnetic field sensing element 80, and a magnetic element 90.

In this embodiment, the top casing 10 includes a top wall 10A and four side walls 10B vertically extended from the top wall 10A. The top wall 10A and four side walls 10B form a receiving space therebetween. An opening 12 is formed on the top wall 10A, and the lens (not shown) in the lens driving device 1 can capture light from the outside through the opening 12.

The top casing 10 can be combined with the bottom base 20 (quadrilateral structure) to form a frame F of the lens driving device 1 for receiving other parts of the lens driving device 1 as described above. A receiving hole 22 is formed on the bottom base 20 for receiving an image sensor (e.g. a CCD or a CMOS, not shown in FIG. 1), wherein the position of the image sensor corresponds to that of the lens. In some embodiments, the image sensor may also be disposed outside the lens driving device 1 and corresponding to the lens through the receiving hole 22 in the bottom base 20.

In this embodiment, the lens holder 30 is a hollow ring structure having a through hole 32, wherein the through hole 32 forms a thread structure (not shown) corresponding to another thread structure on the lens, such that the lens can be screwed into the through hole 32.

In this embodiment, the coil 40 is wound around the periphery of the lens holder 30. Two strip-shaped driving magnets 50, which may be permanent magnets, are fixed on the two respective sides of the bottom base 20 and correspond to the coil 40. By varying the current input into the coil 40, different (attractive or repulsive) magnetic fields are generated between the coil 40 and the driving magnets 50 to drive the lens holder 30 and the lens therein back and forth along the image-capturing optical axis O, so that focusing or zooming is carried out. Note that the number and shape of the driving magnets 50 are not limited to this embodiment (FIG. 1) and can be adjusted according to actual requirements.

Moreover, the lens holder 30 is movably disposed in the frame F of the lens driving device 1 and is elastically clamped by the upper spring sheet 60 and the lower spring sheet 60' from its two opposite sides. Accordingly, the upper and lower spring sheets 60 and 60' can limit the range in which the lens holder 30 can be moved and provide a buffer capacity for the displacement of the lens holder 30 along the X-axis, the Y-axis, and the Z-axis. It should be realized that the assembly method of the upper and lower spring sheets 60 and 60', the lens holder 30, the top casing 10, and the bottom base 20 is known by persons skilled in the field of the invention and thus not described in detail here.

In this embodiment, the lens driving device 1 further has a function of auto-focus (AF). Specifically, the circuit board 70 (e.g. a flexible printed circuit board (FPC)) may be fixed on a side inside the frame F, the magnetic field sensing element 80 (e.g. a Hall effect sensor) is disposed on the circuit board 70, and the magnetic element 90 (e.g. a magnet) can be disposed on a side of the lens holder 30 adjacent to the magnetic field sensing element 80. Thus, the magnetic field sensing element 80 can detect the magnetic field strength variation (i.e. change in magnetic flux density) of the magnetic element 90 so as to learn the movement positions of the magnetic element 90 and the lens holder 30 along the image-capturing optical axis O, and can adjust the current input into the coil 40 by a controller (electrically connected with the magnetic field sensing element 80, not shown in FIG. 1) on the circuit board 70 to change the moving speed of the lens holder 30 and the lens therein along the image-capturing optical axis O (i.e. the Z-axis), thereby adjusting the focusing speed of the lens.

Although the lens driving device 1 of this embodiment (FIG. 1) is a Voice Coil Motor (VCM), the invention is not limited thereto. The lens driving device provided in some embodiments of the invention may also be used in a camera module with Optical Image Stabilization (OIS) technology since it can drive the lens holder 30 along the X-axis and the Y-axis.

Figure 2:
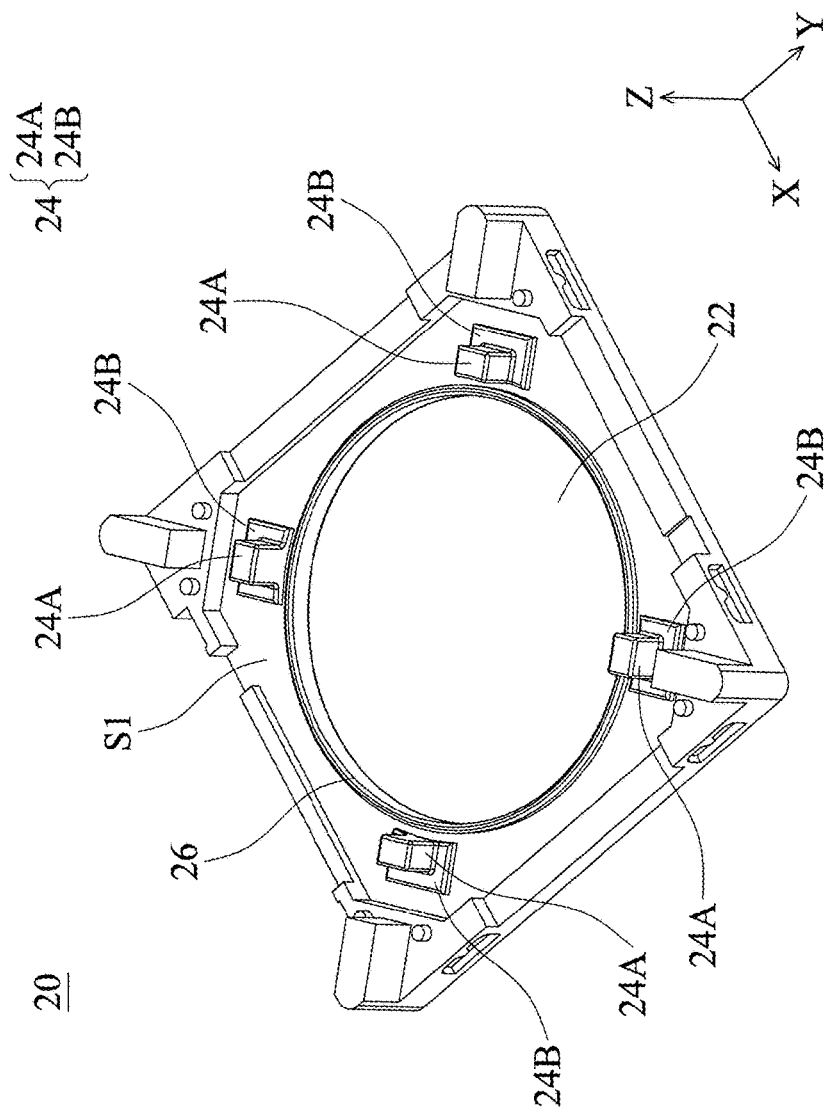
FIG. 2 is an enlarged view of a bottom base of the lens driving device in FIG. 1 from another viewing angle.
Figure 3:
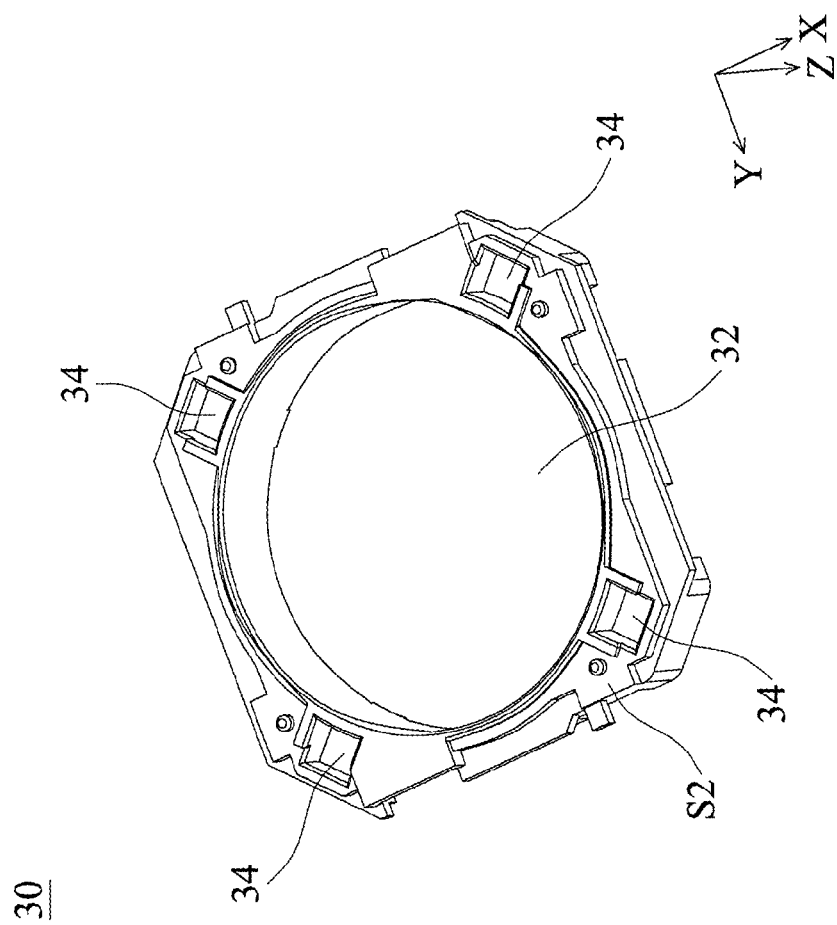
FIG. 3 is an enlarged view of a lens holder of the lens driving device in FIG. 1 from another viewing angle.
Figure 4:
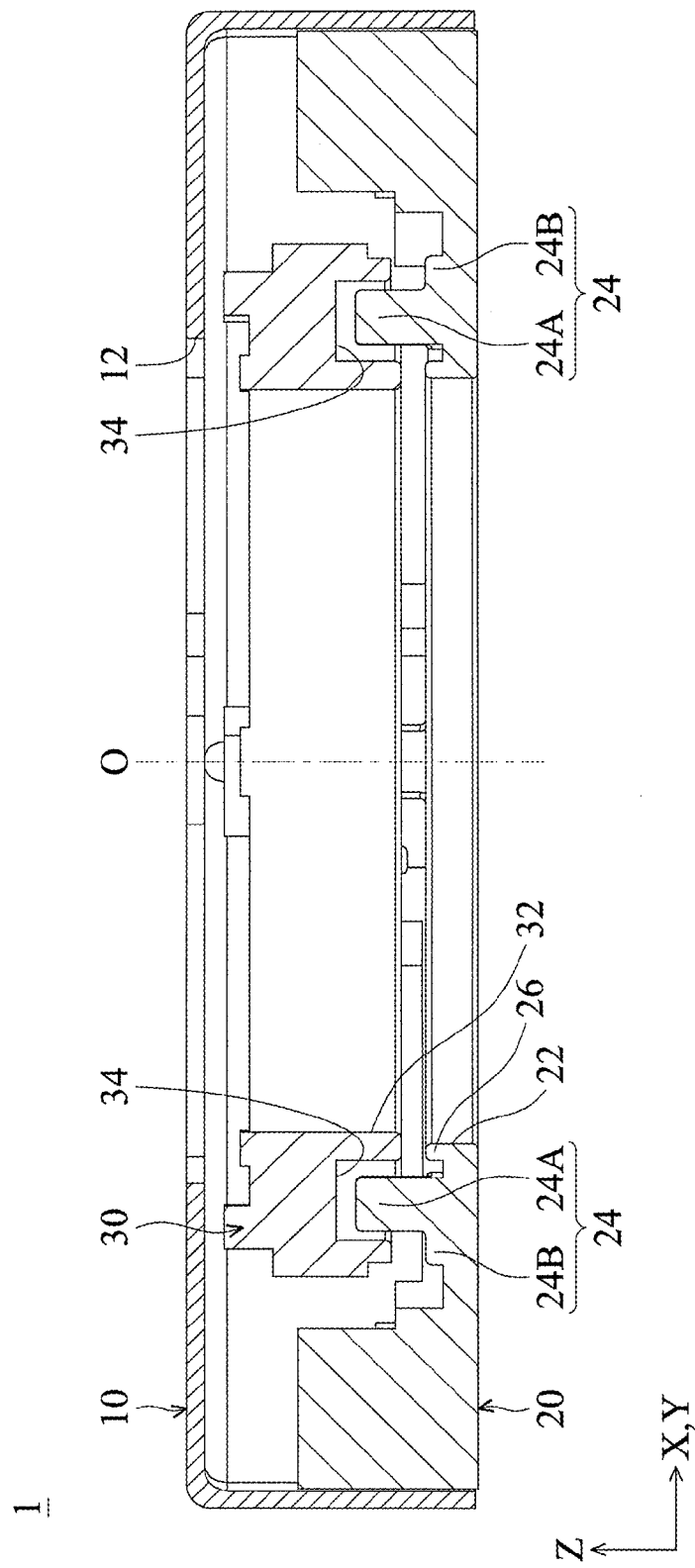
FIG. 4 is a schematic cross-sectional view illustrating that several anti-twist protrusions on the bottom base in FIG. 2 correspond to several anti-twist recesses on the lens holder in FIG. 3.

Next, referring to FIG. 2 to FIG. 4, wherein FIG. 2 is an enlarged view of the bottom base 20 in FIG. 1 from another viewing angle, FIG. 3 is an enlarged view of the lens holder 30 in FIG. 1 from another viewing angle, and FIG. 4 is a schematic cross-sectional view illustrating that several anti-twist protrusions 24 on the bottom base 20 in FIG. 2 correspond to several anti-twist recesses 34 on the lens holder 30 in FIG. 3.

As shown in FIG. 2 to FIG. 4, in this embodiment, several (e.g. four) anti-twist protrusions 24 (second anti-twist structures) are formed on the inner surface S1 of the bottom base 20 and protrude in the Z-axis direction, wherein the four anti-twist protrusions 24 are respectively disposed on opposite sides of the receiving hole 22 in the bottom base 20 and correspond to four corners of the bottom base 20. Moreover, several (e.g. four) anti-twist recesses 34 (first anti-twist structures) corresponding to the anti-twist protrusions 24 are formed on the bottom surface S2 of the lens holder 30 and are depressed in the Z-axis direction. Note that the invention is not limited to this embodiment (FIG. 2 to FIG. 4). In some embodiments, the four anti-twist protrusions 24 may also be disposed on four sides (between the four corners) of the bottom base 20, respectively. Alternatively, there may also be one, two, three, or more than four anti-twist protrusions 24 formed on the surface S1 of the bottom base 20, and the surface S2 of the lens holder 30 may also have one, two, three, or more than four anti-twist recesses 34 (corresponding to the number of anti-twist protrusions 24) thereon.

After finishing assembly of the lens driving device 1 of this embodiment (see FIG. 4), the anti-twist protrusions 24 on the bottom base 20 and the anti-twist recesses 34 on the lens holder 30 can engage with each other, so that the rotation angle of the lens holder 30 in the XY plane (see FIG. 2 to FIG. 4) is restricted. Thus, when the lens is screwed into the through hole 32 of the lens holder 30, the torsional force generated may not be too large, thereby preventing damage to the upper and lower spring sheets 60 and 60' which are connected with the lens holder 30. Furthermore, this design also prevents torsion failure of the lens holder 30 (as its rotation angle is restricted) and can increase the reliability of the lens driving device 1.

In this embodiment (FIG. 2 to FIG. 4), each anti-twist protrusion 24 on the bottom base 20 is ladder-shaped and has a main body part 24A and a base part 24B. The base part 24B is connected between the surface S1 of the bottom base 20 and the main body part 24A, thereby increasing overall structural strength of the anti-twist protrusion 24 and preventing it from deforming easily.

Referring to FIG. 2, in this embodiment, a dust-proof structure 26 is further formed on the surface S1 of the bottom base 20. More specifically, the dust-proof structure 26 is an annular protrusion structure which surrounds the circular receiving hole 22 on the bottom base 20. However, the receiving hole 22 may also have other shapes (e.g. square) in some embodiments, and the dust-proof structure 26 is protruding from the surface S1 of the bottom base 20 along the receiving hole 22 (i.e. fitting the shape of the receiving hole 22) in those cases.

Note that the dust-proof structure 26 can prevent dust from entering the receiving hole 22 having an image sensor received therein, so that the image sensing quality of the image sensor is maintained. This working principle will be introduced further in the following description.

Figure 5:
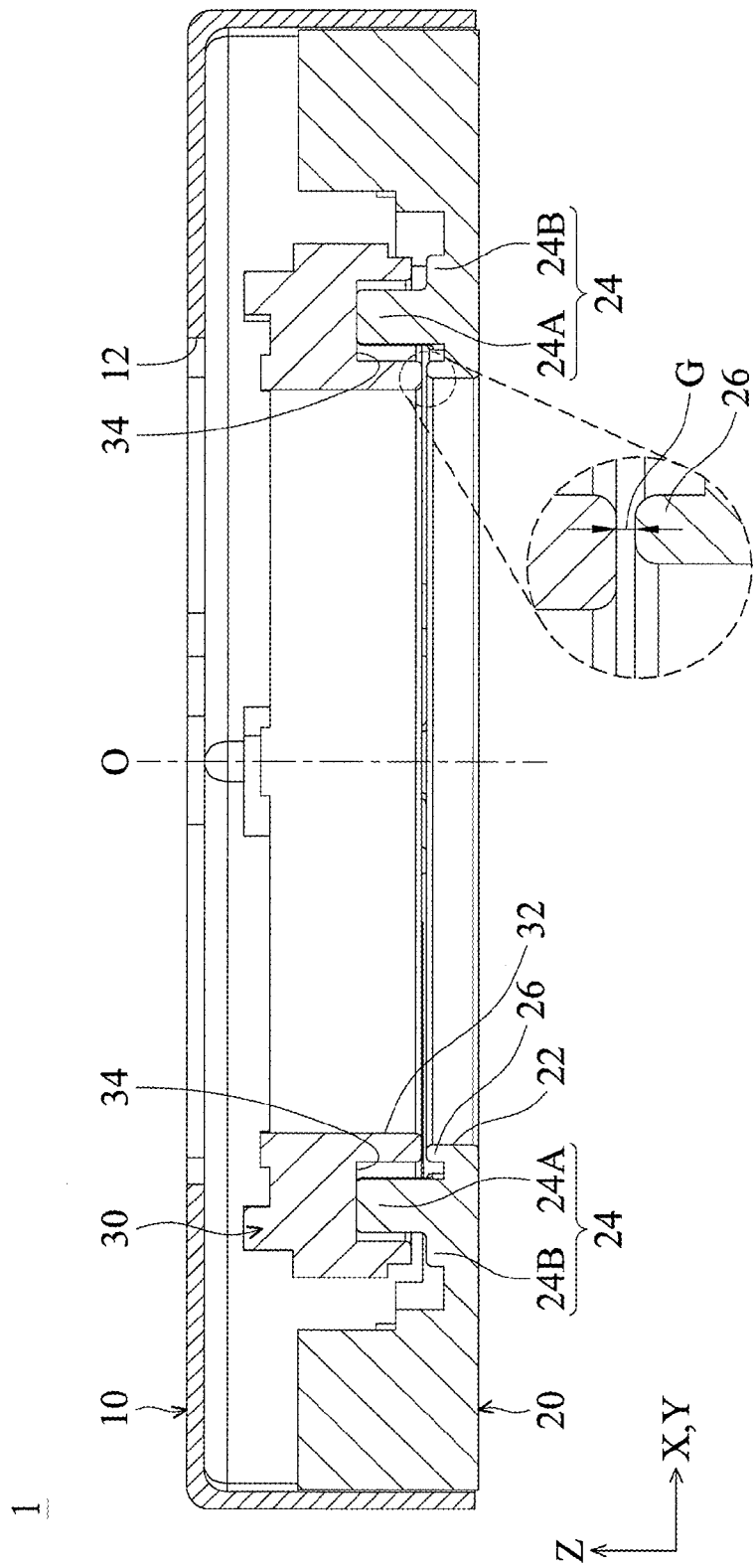
FIG. 5 is a schematic cross-sectional view illustrating that the bottom surfaces of the anti-twist recesses abut the top surfaces of the anti-twist protrusions in FIG. 4.

Referring to FIG. 5, which is a schematic cross-sectional view illustrating that the bottom surfaces of the anti-twist recesses 34 abut the top surfaces of the anti-twist protrusions 24 in FIG. 4. As shown in FIG. 5, when the lens holder 30 moves along the image-capturing optical axis O and abuts the bottom base 20, the bottom surfaces of the anti-twist recesses 34 on the lens holder 30 can abut the top surfaces of the anti-twist protrusions 24 on the bottom base 20. But the lens holder 30 now does not contact the dust-proof structure 26 (i.e. they have a gap G therebetween). In this way, it prevents the dust generated from collision between the lens holder 30 and the dust-proof structure 26 from directly entering the receiving hole 22.

It should be realized that, each anti-twist protrusion 24 on the bottom base 20 in this embodiment can be used as a stopper structure for restricting the displacement of the lens holder 30 toward the bottom base 20. More specifically, when the lens holder 30 moves toward the bottom base 20 and the first and second anti-twist structures 34 and 24 contact each other, the lens holder 30 is restricted to further move toward the bottom base 20. Moreover, the height (in Z-axis direction) of the dust-proof structure 26 is less than that of the anti-twist protrusions 24. In other words, the distance between the lens holder 30 and the anti-twist protrusions 24 is less than the distance between the lens holder 30 and the dust-proof structure 26.

Figure 6:
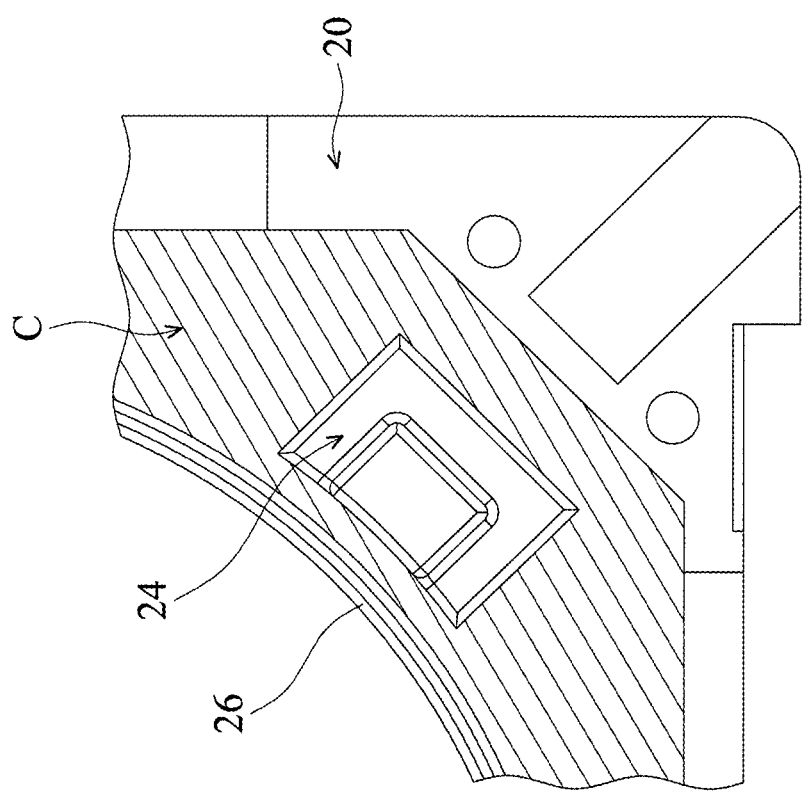
FIG. 6 is a schematic view illustrating an adhesive layer being coated on the surface of the bottom base in FIG. 2.

Next, referring to FIG. 2 and FIG. 6, wherein FIG. 6 is a schematic view illustrating an adhesive layer being coated on the surface S1 of the bottom base 20 in FIG. 2. In this embodiment, an adhesive layer C is further coated on the surface S1 of the bottom base 20, and the adhesive layer C comprises a double-sided adhesive or other optional adhesive. More specifically, the adhesive layer C is coated on all regions of the surface S1 of the bottom base 20 (except the regions with the anti-twist protrusions 24) including the regions between the anti-twist protrusions 24 and the dust-proof structure 26 (see FIG. 6). Note that the adhesive layer C is formed in a recess of the bottom base 20, and the recess is annular and adjacent to the dust-proof structure 26 (see FIG. 6 and FIG. 7).

Accordingly, when the dust generated from collision between the lens holder 30 and other parts in the lens driving device 1 falls on the surface S1 of the bottom base 20, it can adhere to the adhesive layer C, so that the chance of the dust entering the receiving hole 22 of the bottom base 20 is reduced.

Figure 7:
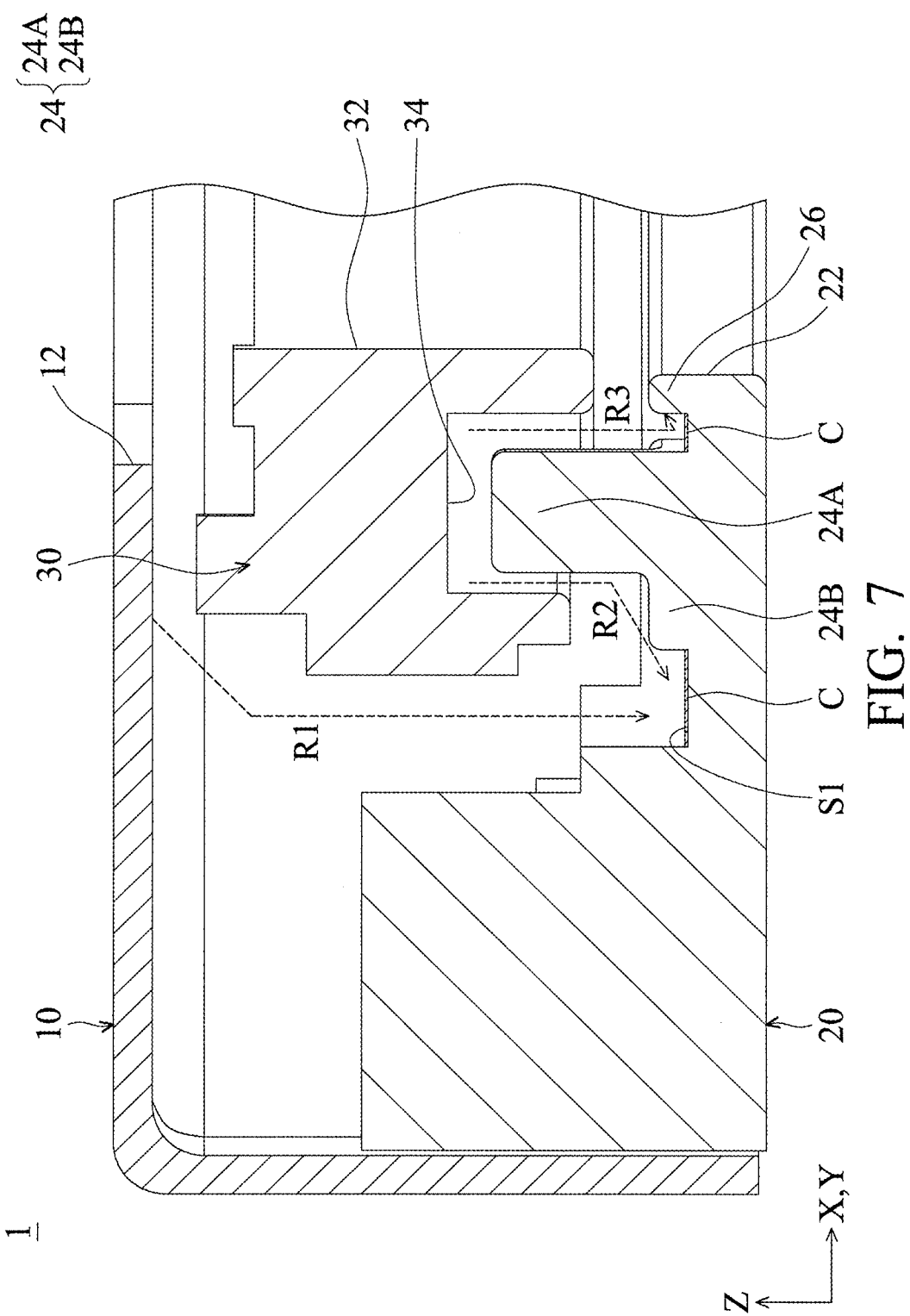
FIG. 7 is a schematic view illustrating the moving routes of dust generated from collision between the lens holder in FIG. 4 and other parts in the lens driving device.

Referring to FIG. 7, which is a schematic view illustrating the moving routes of dust generated from collision between the lens holder 30 in FIG. 4 and other parts in the lens driving device 1. More specifically, when the lens holder 30 moves upward and collides with the top casing 10, the dust that is generated can fall on the surface S1 of the bottom base 20 without the anti-twist protrusions 24 (as the moving route R1 indicates in FIG. 7) and can adhere to the adhesive layer C on the surface S1. In addition, when the lens holder 30 moves downward and collides with the bottom base 20, the dust generated from collision between the bottom surfaces of the anti-twist recesses 34 on the lens holder 30 and the top surfaces of the anti-twist protrusions 24 on the bottom base 20 can fall on the surface S1 of the bottom base 20 at the outer and inner sides of the anti-twist protrusions 24 (as the moving routes R2 and R3 indicate in FIG. 7) and can also adhere to the adhesive layer C on the surface S1. Thus, the chance of the dust rebounding from the surface S1 and entering the receiving hole 22 in the bottom base 20 can be greatly reduced.

In order to reduce the generation of dust, the lens holder 30 and the bottom base 20 can have substantially the same hardness. For example, the lens holder 30 and the bottom base 20 in some embodiments are made of plastic material and have substantially the same hardness, but the invention is not limited thereto.

With the design of the dust-proof structure 26 (see FIG. 7), the dust moving along the route R3 and not adhered by the adhesive layer C can also be blocked, so that the dust may not enter the receiving hole 22 having an image sensor received therein, thereby maintaining the image sensing quality of the image sensor. It is advantageous that the dust-proof structure 26 and the adhesive layer C can also prevent dust from easily invading the lens in the lens holder 30, thereby improving the image quality of the lens.

As mentioned above, the invention provides a lens driving device having anti-twist and dust-proof designs. The lens driving device primarily includes a frame, a lens holder, and a dust-proof structure. The frame includes a top casing and a bottom base. The lens holder carries a lens and is movably disposed in the frame and has at least one anti-twist recess (first anti-twist structure). At least one anti-twist protrusion (second anti-twist structure) corresponding to the at least one anti-twist recess is formed on the surface of the bottom base. The dust-proof structure is formed on the surface of the bottom base to prevent dust from entering a receiving hole in the bottom base which is used for receiving an image sensor. Note that, in some embodiments, the positions of the anti-twist protrusions and the anti-twist recesses as described above may also be exchanged, namely, the anti-twist protrusions (first anti-twist structures) may also be formed on the bottom surface of the lens holder, and the anti-twist recesses (second anti-twist structures) may also be formed on the inner surface of the bottom base and corresponding to the respective anti-twist protrusions (in this state, the adhesive layer C is coated on all regions of the surface S1 of the bottom base 20 (except the regions with the anti-twist recesses 34) including the regions between the anti-twist recesses 34 and the dust-proof structure 26). With the above structural design, the lens driving device of the invention can avoid damage being caused to the spring sheets (upper and lower spring sheets) by the torsional force generated by the lens being screwed into the through hole of the lens holder, and can prevent the image sensing quality of the image sensor from being affected by the dust.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens driving device, comprising:
   a frame including a top casing and a bottom base;
   a lens holder carrying a lens and movably disposed in the frame, wherein the lens holder has a first anti-twist structure, a second anti-twist structure corresponding to the first anti-twist structure is formed on a surface of the bottom base, and the first anti-twist structure engages with the second anti-twist structure to restrict a rotation angle of the lens holder; and
   a dust-proof structure formed on the surface of the bottom base to prevent dust from entering a receiving hole in the bottom base, and the receiving hole is used for receiving an image sensor;
   wherein when the lens holder moves toward the bottom base and the first and second anti-twist structures contact each other, the lens holder does not contact the dust-proof structure.

2. The lens driving device as claimed in claim 1, wherein the dust-proof structure is protruding from the surface of the bottom base along the receiving hole, and the dust-proof structure is an annular protrusion structure.

3. The lens driving device as claimed in claim 1, wherein the lens holder further has a plurality of first anti-twist structures.

4. The lens driving device as claimed in claim 3, wherein the surface of the bottom base further forms a plurality of second anti-twist structures corresponding to the first anti-twist structures, and the bottom base is a quadrilateral structure with the second anti-twist structures disposed at four corners thereof.

5. The lens driving device as claimed in claim 1, further comprising an adhesive layer coated on the surface of the bottom base.

6. The lens driving device as claimed in claim 5, wherein the adhesive layer is also coated on the surface of the bottom base between the second anti-twist structure and the dust-proof structure.

7. The lens driving device as claimed in claim 6, wherein the dust-proof structure is protruding from the surface of the bottom base along the receiving hole, and the dust-proof structure is an annular protrusion structure.

8. The lens driving device as claimed in claim 1, wherein the height of the dust-proof structure is less than that of the second anti-twist structure.

9. The lens driving device as claimed in claim 1, wherein the second anti-twist structure has a main body part and a base part, and the base part is connected between the surface of the bottom base and the main body part for increasing overall structural strength of the second anti-twist structure.

10. A lens driving device comprising:
    a frame including a top casing and a bottom base, wherein the bottom base has a surface and a recess formed on the surface;
    a lens holder carrying a lens and movably disposed in the frame, wherein the lens holder has an anti-twist recess, an anti-twist protrusion corresponding to the anti-twist recess is formed on the surface of the bottom base, and the anti-twist protrusion and the anti-twist recess engage with each other to restrict a rotation angle of the lens holder; and
    an adhesive layer formed in the recess of the bottom base to adhere dust in the frame, wherein the height of the adhesive layer from the surface of the bottom base to a top surface of the adhesive layer is less than the height of the anti-twist protrusion.

11. The lens driving device as claimed in claim 10, wherein the bottom base further has a dust-proof structure formed on the surface of the bottom base to prevent dust from entering a receiving hole in the bottom base, and the receiving hole is used for receiving an image sensor.

12. The lens driving device as claimed in claim 11, wherein the dust-proof structure is protruding from the surface of the bottom base along the receiving hole, and the dust-proof structure is an annular protrusion structure.

13. The lens driving device as claimed in claim 12, wherein the recess is annular and adjacent to the dust-proof structure.

14. The lens driving device as claimed in claim 10, wherein the recess is annular.

15. The lens driving device as claimed in claim 10, wherein the anti-twist protrusion on the bottom base is a stopper structure used to restrict the displacement of the lens holder toward the bottom base.

16. The lens driving device as claimed in claim 15, wherein the bottom base further has a dust-proof structure formed on the surface of the bottom base to prevent dust from entering a receiving hole in the bottom base, and the receiving hole is used for receiving an image sensor.

17. The lens driving device as claimed in claim 16, wherein the stopper structure is ladder-shaped and has a main body part and a base part, wherein the base part is connected between the surface of the bottom base and the main body part for increasing overall structural strength of the stopper structure.

18. The lens driving device as claimed in claim 16, wherein the height of the dust-proof structure is less than that of the stopper structure.

19. The lens driving device as claimed in claim 18, wherein the distance between the lens holder and the stopper structure is less than the distance between the lens holder and the dust-proof structure.

* * * * *